US 6,648,167 B1

(12) United States Patent
Brupbacher et al.

(10) Patent No.: US 6,648,167 B1
(45) Date of Patent: Nov. 18, 2003

(54) DUCTING PASSAGES FOR A POLYMERIC LINING

(75) Inventors: John M. Brupbacher, Baltimore, MD (US); Scott E. Vogt, Catonsville, MD (US)

(73) Assignee: Sermatech International, Inc., Limerick, PA (US)

( * ) Notice: Subject to any disclaimer, the term of this patent is extended or adjusted under 35 U.S.C. 154(b) by 75 days.

(21) Appl. No.: 09/782,870

(22) Filed: Feb. 14, 2001

(51) Int. Cl.$^7$ .............................................. B65D 25/00
(52) U.S. Cl. ................... 220/586; 220/4.13; 220/62.22; 220/745; 220/DIG. 27
(58) Field of Search ........................... 220/62.22, 4.12, 220/4.13, 565, 571, 586, 587, 745, DIG. 27

(56) References Cited

U.S. PATENT DOCUMENTS

| | | | |
|---|---|---|---|
| 2,690,411 A | | 9/1954 | Seymour ..................... 154/43 |
| 3,412,891 A | * | 11/1968 | Bastone et al. ......... 220/4.12 X |
| 4,166,536 A | | 9/1979 | Roberts et al. .......... 206/524.3 |
| 4,321,177 A | | 3/1982 | Wilkinson .................. 524/375 |
| 4,552,166 A | * | 11/1985 | Chadbourne, Sr. et al. ....................... 220/465 X |
| 4,651,893 A | * | 3/1987 | Mooney ................. 220/469 X |
| 4,739,895 A | * | 4/1988 | Bachmann .............. 220/461 X |
| 4,779,757 A | | 10/1988 | Fuckert et al. .............. 220/456 |
| 4,859,262 A | * | 8/1989 | Sharp ..................... 220/469 X |
| 5,002,195 A | * | 3/1991 | Lasson ...................... 220/4.12 |
| 5,102,005 A | * | 4/1992 | Trussler ................. 220/4.13 X |
| 5,502,097 A | | 3/1996 | Saito .......................... 524/389 |
| 5,972,494 A | | 10/1999 | Janssens ..................... 428/324 |
| 6,026,977 A | * | 2/2000 | Palazzo ................. 220/4.13 X |

FOREIGN PATENT DOCUMENTS

GB 2051091 A 1/1981

OTHER PUBLICATIONS

"Advanced Coating Lining Systems for Challenging Chemical Environments", J.M. Brupbacher and J.E. Stiles, Materials Performance, vol. 37, No. 8, pp. 35–40, Aug. 1998, NACE Int'l.
"Fluoropolymer lining system design", D. Mason, Chemical Processing, p. 43, May 1994, Putman Publishing.
"Fluoropolymers for Chemical Handling Applications", P.R. Khaldkar, pp. 311–326 of "Modern Fluoropolymers: High Performance Polymers for Diverse Applications", John Wiley & Sons, 1997.

* cited by examiner

Primary Examiner—Joseph M. Moy
(74) Attorney, Agent, or Firm—Drinker Biddle & Reath LLP (57) ABSTRACT

A substrate protected by a polymeric lining wherein passageways are provided between the lining and the substrate for channeling of fluids which may penetrate through the lining to the substrate surface. In one embodiment the lining is formed to provide for passages between the lining and the substrate. Mesh attached to the substrate provides for securement of the lining to the substrate by at least partial embedment of the mesh within the lining. Wire spacers are positioned between the mesh and the substrate to separate portions of the lining from the substrate surface and form passageways for channeling fluid which may penetrate the lining. In another embodiment a vessel includes a network of spacers forming a generally parallel array of passageways and at least one passageway transverse to the parallel array of passageways.

26 Claims, 4 Drawing Sheets

DUCTING PASSAGES FOR A POLYMERIC LINING

FIELD OF THE INVENTION

The present invention relates to polymeric linings for protecting the surface of a substrate from contamination or corrosion by a fluid.

BACKGROUND OF THE INVENTION

It is known in the art to provide linings adjacent the surface of a substrate to protect the substrate from contamination or corrosion. Protective linings are well known in the chemical process industry for protecting equipment such as vessels, pipes, pumps and valves from corrosive fluids handled by the equipment. Components of such equipment to be protected are commonly made from steel because of strength, ease of manufacture and cost considerations but may also be made from other materials.

Early forms of protective linings included linings made from glass for protecting inner walls of steel vessels. The protection provided by these glass linings greatly extended the service life of processing equipment in certain applications. However, glass linings are not resistant to certain fluids frequently handled or generated by chemical process equipment. For example, glass will be dissolved by contact with hydrofluoric acid.

More recently, linings made from polymers have been used for protecting substrates, including components of chemical process equipment. Prominent among the polymers used for protection of process equipment are various fully (i.e., perfluorinated) and partially fluorinated polymers. Linings made from fully fluorinated polymers have advantages over other materials such as glass in certain applications because they are chemically inert and highly resistant to chemical attack. Fully fluorinated polymers which have been used in this capacity include polytetrafluoroethylene (PTFE), and perfluoroalkoxy-tetrafluoroethylene copolymer (PFA), fluorinated ethylene-propylene copolymer (FEP). PFA is a copolymer of tetrafluoroethylene [$CF_2$=$CF_2$] with a perfluoroalkyl vinyl ether [$F(CF_2)_mCF_2OCF$=$CF_2$]. The resultant polymer contains the carbon-fluorine backbone chain typical of PTFE with perfluoroalkoxy side chains. One particular form of PFA which has been used for linings is tetrafluoroethylene-perfluoromethylvinylether copolymer (MFA). Partially fluorinated polymers such as ethylene-chlorotrifluoroethylene copolymer (ECTFE), ethylene-tetrafluoroethylene copolymer (ETFE) and polyvinylidene fluoride (PVDF) have also been used in linings for chemical process equipment although these materials are less chemically resistant than the fully fluorinated polymers.

Known methods of applying polymeric linings to a substrate include coating processes in which a polymeric material is applied to the substrate in the form of a liquid dispersion or a powder. Liquid dispersions, comprising polymeric material in a water or solvent suspension, are typically applied in a spray and bake coating process in which the liquid dispersion is sprayed onto the substrate for subsequent heating above the melting temperature of the polymeric material contained in the dispersion. Known methods of applying polymeric material in powdered form include spraying of the powder onto the substrate using an electrostatic gun or a flocking gun, for example. Typically, the powder is sprayed onto a substrate which has been heated above the melt temperature of the polymeric material to form a lining. It is also known to apply linings in a process known as "rotolining" in which the substrate and powder is heated, in an oven for example, above the melt temperature of the polymeric material while the substrate is rotated to form a seamless lining on the substrate.

Early efforts to deal with issues relating to bonding of the polymer lining to the substrate included chemical bonding systems in which a primer was applied to the substrate prior to coating with polymer. More recently, mechanical bonding systems have been used to augment or replace the chemical bonding provided by the primer process. An example of a mechanical bonding system includes the use of wire mesh secured to the substrate prior to application of the coating to form the polymer lining. The wire mesh is typically secured to the substrate by tack welding, or "micro-welding", to achieve intermittent fusion of the mesh to the substrate without affecting the integrity of the substrate. In a known method, a resistance welding tool is directed over the mesh covered substrate to create fusion between the mesh and the substrate as the welding tool contacts the threads of the mesh. The polymer lining is then applied to the mesh-covered substrate in a polymer coating process wherein melt flow of a polymer contained in a liquid dispersion or powder results in intermingling interaction between the threads of the mesh and the lining to interlock the lining and the mesh. The location of the mesh in flush contact with the surface of the substrate results in contact between the polymer and the substrate surface between the threads of the mesh. The mechanical interlocking of the lining to the mesh results in enhanced performance and extended life for chemical process equipment incorporating this system.

The polymeric linings of the prior art systems provide barrier protection for substrates such as reaction and storage vessels by reducing contact of the substrate with corrosive liquids and gases. However, polymer linings are not impervious to propagation of corrosive fluids which may eventually penetrate the lining and become trapped on the substrate side of the lining, in contact with the substrate. This is particularly true for chemical process equipment which may operate at elevated temperatures and pressures. The rate of propagation of a fluid through a polymer lining is generally enhanced under increased temperatures and pressures. The propagation of corrosive fluid through the protective lining to the backside of the lining is undesirable not only for reasons of contamination or corrosion of the substrate surface but also for reasons of degradation of the chemical and/or mechanical bonding system securing the lining to the substrate. The present invention provides for the channeling of the propagated fluid at the backside of the lining facilitating removal of the fluid in a venting removal system for example.

U.S. Pat. No. 4,166,536 to Roberts et al. is directed to a corrosive chemical containment system. A vessel contains a barrier coating of a corrosion-resistant polymer matrix which includes an inert filler. The coating has a controlled porosity. According to Roberts et al., chemicals trapped in the coating can permeate, so as to prevent delamination, blistering rupture or other types of coating failures.

What is needed is a polymeric lining system for protecting a substrate such as a vessel such that fluids which have propagated through the lining to the interface between the lining and the substrate are channeled away.

SUMMARY OF THE INVENTION

According to the present invention there is provided a substrate protected by a polymeric lining positioned adjacent a surface of the substrate. Passages are provided between the lining and the substrate for channeling of fluids which may penetrate through the lining to the substrate surface.

According to an embodiment of the invention, the lining is formed to provide for passages between the lining and the substrate. Structure attached to or formed in the substrate provides for securement of the lining to the substrate. Preferably, the structure is a mesh which is secured to the substrate surface and which becomes at least partially embedded in the lining to secure the lining to the mesh. Elongated spacers are positioned between the mesh and the substrate and function to separate portions of the lining from the substrate surface such that the separated portions of the lining and the substrate define passageways for channeling fluid which may penetrate the lining. Preferably, the elongated spacers are lengths of wire having a circular cross-section.

According to an embodiment of the invention, the substrate surface is formed to provide for passages between the lining and the substrate.

According to an embodiment of the invention, a surface of a vessel is protected by a lining wherein either or both of the vessel surface and the lining are formed or disposed to provide passageways for channeling fluid which may penetrate through the lining. A mesh is secured to the vessel surface over a network of spacers which include spacers extending substantially parallel to one another to form a generally parallel array of passageways and at least one spacer which is transverse to the parallel array of passageways to form a generally transverse passageway.

According to an embodiment of the invention the lining is made from a fluoropolymer selected from the group consisting of polytetrafluoroethylene, perfluoroalkoxy-tetrafluoroethylene copolymer, fluorinated ethylene-propylene copolymer, ethylene-chlorotrifluoroethylene copolymer, ethylene-tetrafluoroethylene copolymer, polyvinylidene fluoride and combinations thereof.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Referring to the drawings where like numerals identify like elements, there is shown a system 10 according to the present invention for protecting a substrate 12 from contamination or damage by accumulation of a fluid in contact with the substrate. The fluid for which limited contact with the substrate is desired may be in liquid or gas form. The substrate may comprise any surface of a body which is exposed to a fluid environment. The substrate, not limited to any particular material, is typically metal. Although the substrate is shown as comprising a single layer, the invention is not so limited and has potential application to any substrate including multiple-layered or laminated substrates. The present invention has particular application for protecting interior surfaces of chemical process equipment such as storage and reaction vessels, pipes, pumps and valves. The present invention is also well suited for protection of exterior surfaces located in contaminating environments such as elements of structures located in salt water. However, the invention is not limited to the examples mentioned and has potential application where limited contact is desired between a substrate and a liquid or gas which need not necessarily be a corrosive.

Figure 1:
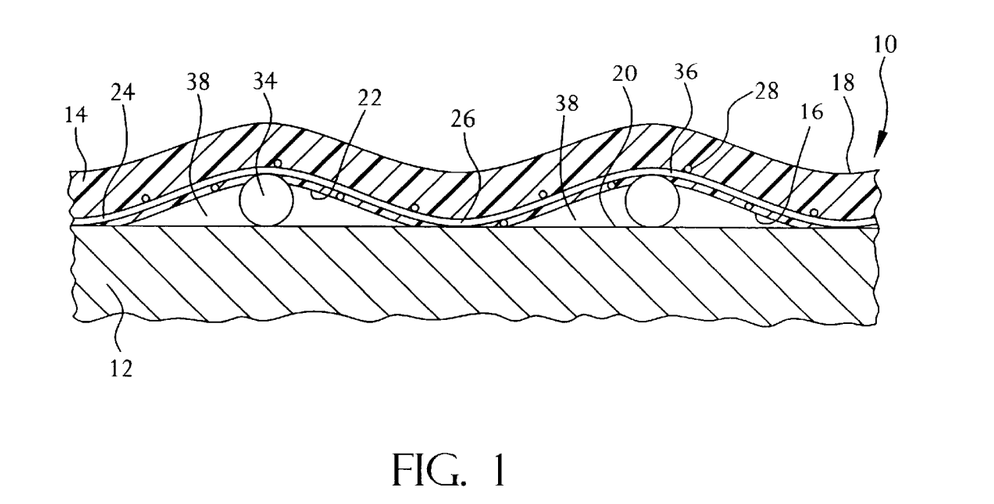
FIG. 1 is a sectional view of a substrate on which the protective system of the present invention has been applied.

Referring to FIG. 1, the protective system 10 includes a lining 14 having opposite surfaces 16,18. The lining 14 is supported by the substrate such that surface 16 of the lining is adjacent to surface 20 of the substrate 12. The lining 14 is made from a polymeric material. Suitable material for forming the lining include any polymeric material which is capable of forming a lining on a substrate. The polymeric material may comprise an elastomer. Preferably, the polymeric material forming the lining will be resistant to attack by corrosive fluids, although as stated previously, the liquid or gas for which limited contact with the substrate is desired need not necessarily be a corrosive. Corrosion-resistant polymeric material includes, for example, fluoropolymers and other halogen-containing polymers. The term "fluoropolymer" is meant to identify a polymer in which one or more repeating subunits contains at least one fluorine atom. Fluoropolymers may be partially or fully fluorinated polymers. Suitable fully fluorinated polymers include polytetrafluoroethylene (PTFE), perfluoroalkoxy-tetrafluoroethylene copolymer (PFA) and fluorinated ethylene-propylene copolymer (FEP). Examples of partially fluorinated polymers suitable for use in a protective system according to the present invention include ethylene-chlorotrifluoroethylene copolymer (ECTFE), ethylene-tetrafluoroethylene copolymer (ETFE) and polyvinylidene fluoride (PVDF) although these materials are less chemically resistant than the fully fluorinated polymers. The use of fluorinated polymers to form lining 14 provides for a chemically inert lining possessing resistance to substrate-corrosive fluids such as hydrofluoric acid. The present invention, however, is not limited to fluoropolymer linings. Examples of other polymers which could be used alone, or in combination with each other or with the above-mentioned fluoropolymers include polyether sulfone (PES), polyphenylene sulfide (PPS) and polyether ether ketone (PEEK).

Figure 2:
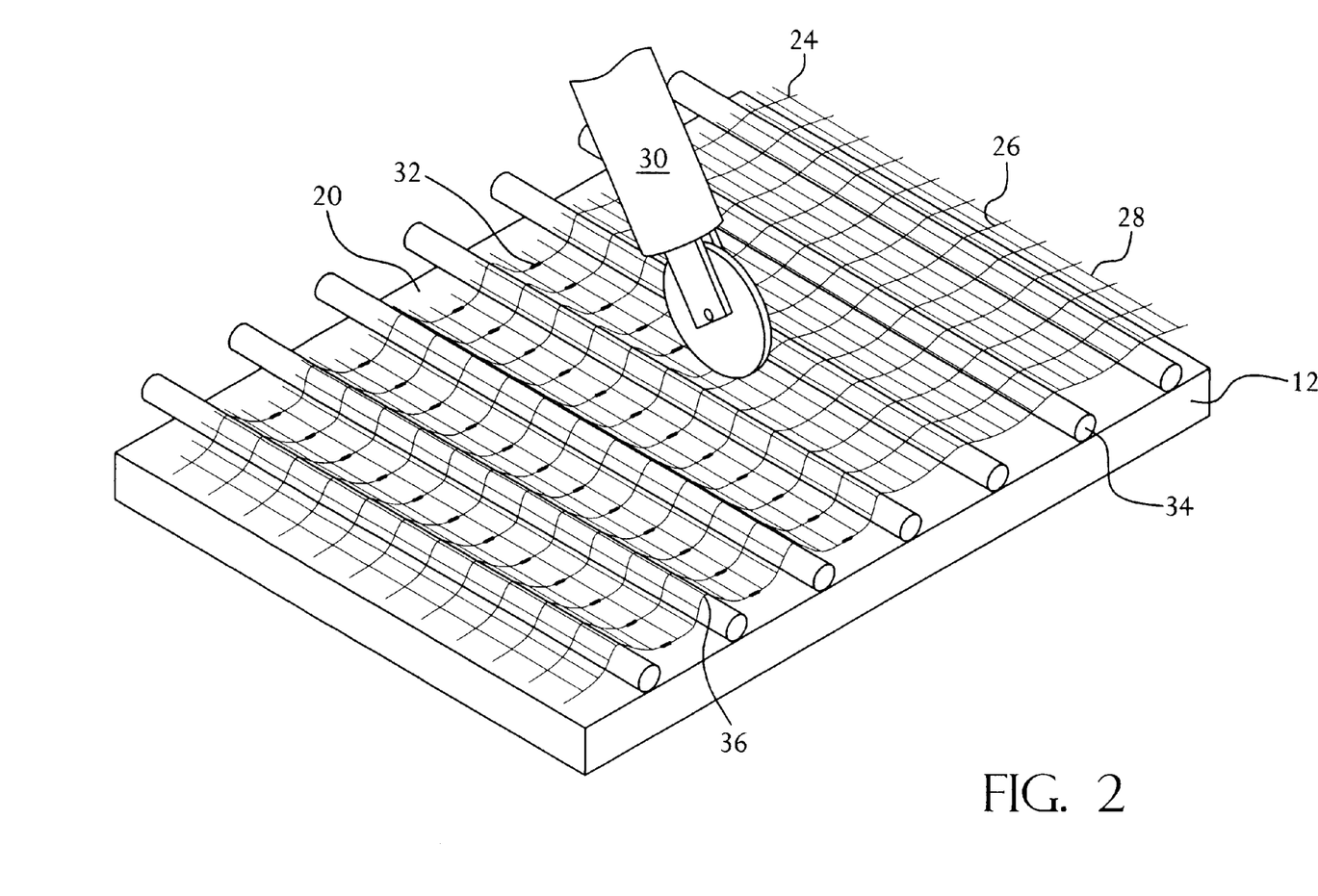
FIG. 2 is a perspective view illustrating a support mesh being secured to a substrate over spacers according to the present invention.

The protective system 10 as seen in the sectional view of FIG. 1 includes tent-like formations 22 in surface 16 of lining 14. The tented portions 22 extend along the lining 14 to provide a location for elongated ducting passages to channel fluid which has penetrated through the lining 14 from surface 18 to surface 16. Referring to FIG. 2, various features of the system 10 as well as a preferred method of assembly are shown. For illustrative purposes only, the substrate is shown as a planar plate member. However, the present invention is applicable to substrate surfaces having various geometries. The system 10 includes a metal mesh 24 having orthogonal threads 26, 28 and which functions as an attachment member to secure the lining 14 to-be-applied to the surface 20 of the substrate 12. For steel substrates, the metal mesh is preferably made of stainless steel. However, other combinations of materials for the substrate and the mesh are equally feasible according to the present invention. The metal mesh 24 is secured by any suitable attachment means. However, attachment by micro-welding is preferred. The process utilizes resistance welding to intermittently fuse the metal mesh 24 to the substrate 12. The intermittent fusing of the mesh to the substrate has no affect on the integrity of the substrate, and may thus be employed in pressure vessels. As seen in FIG. 2, a resistance welding tool 30 is directed over the mesh 24 to create the intermittently spaced micro-weldments 32 as the tool 30 contacts the metal threads 26 of the mesh 24.

The system 10 further includes spacers 34 which are most preferably lengths of wire having a generally circular cross-section. The spacers 34 are positioned between the mesh 24 and the substrate 12 before the mesh is secured to surface 20 of substrate 12. As seen in FIG. 2, the presence of the spacers 34 between the mesh and the substrate functions to deform the mesh 24 as the mesh is secured to the substrate and form ridges 36 in the mesh 24. The creation of ridges 36 in this manner ensures separation between the mesh 24 and the substrate surface 20 on opposite sides of the spacers 34.

After the mesh 24 has been secured to the substrate 12 and deformed by the spacers 34, the polymer lining 14 is applied to the substrate 12 by any suitable polymer coating process. Examples of suitable processes for applying a polymeric lining according to the present invention include spraying of a liquid dispersion in a spray and bake process, electrostatic or flocking spray of a powder, and rotolining of a powder. As described in U.S. Pat. No. 4,321,177 to Wilkinson, which is incorporated herein by reference, a spray and bake process involves spraying of a liquid dispersion containing polymeric material at room temperature for subsequent heating of the substrate above the melt temperature of the polymeric material. The placement of the polymeric material at room temperature is advantageous particularly in applications where access to the substrate surface is limited, such as for the interior surface of a vessel for example. Spray application of a powder containing a polymer, or polymers, is described in U.S. Pat. No. 5,972,494 to Janssens which is incorporated herein by reference. As described, the powder is typically applied to a substrate heated above the melt temperature of the polymer. In a rotolining process, a substrate is rotated and heated, in an oven for example, to cause melt flow of the polymeric material on a surface of the rotating substrate.

Examples of commercially available polymeric material suited for use in a liquid dispersion coating process according to the present invention include: FLUOROSHIELD™, a PFA of W. L. Gore & Associates of Newark, Del.; RUBY RED™, a PFA of E. I. DuPont de Nemours of Wilmington, Del. and DYKOR™ 404, an ECTFE of Whitford Corporation of West Chester, Pa..

Examples of commercially available polymeric material suited for use in a powder coating process according to the present invention: TEFLON™, a PFA of E. I. DuPont de Nemours of Wilmington, Del.; HYFLON™, an MFA of Ausimont USA Inc. of Thorofare, N.J.; HALAR™, an ECTFE of Ausimont USA Inc. of Thorofare, N.J.; AFLON™, an ETFE of AGA Chemicals of Charlotte, N.C.; NEOFLON™, an FEP supplied by Daikin America, Inc. of Orangeburg, N.Y., and KYNAR™, a PVDF sold by Atofina Chemicals of Philadelphia, Pa..

It should be understood that the invention is not limited to linings consisting entirely of polymers. The invention also has application to linings made from a mixture of a polymer, or polymers, and fillers such as mica or talc as disclosed, for example, in U.S. Pat. No. 5,972,494 to Janssens.

The application of the lining 14 over the deformed metal mesh 24 results in portions of the lining 14 on opposite sides of the spacers 34 which are separated from the substrate surface 20. The separated portions of the lining 14 and the substrate surface 20 define elongated passages 38 between the lining 14 and the substrate 12 for channeling of fluid which has penetrated through the lining 14 to reach the substrate surface 20. The open geometry of the mesh 24 provides for intermingling of the flowing polymeric material with the threads 26,28 of the mesh 24. As seen in FIG. 2, the intermingling of the polymeric material results in embedment of the mesh 24 within the cured lining 14 adjacent to the surface 16. The intermingling engagement between the mesh 24 and the lining 14 mechanically secures the lining 14 to the mesh 24 thereby securing the lining 14 to the substrate 12. The mesh 24 should be sufficiently fine such that the polymeric material intermingles with the mesh without flowing freely through the mesh into the spaces on opposite sides of the spacers 34 between the substrate surface 20 and the portions of the mesh separated from the surface 20 by the spacers 34. However, the mesh 24 should not be so fine that the polymeric material pools on the top of the mesh without intermingling with the threads of the mesh to embed the mesh 24 in the cured lining 14. The viscosity of the flowing polymeric material may also affect the above-described separated intermingling between the lining 14 and the mesh 24 on opposite sides of the spacers 34. If the viscosity of the flowing polymeric material is too low, the material may merely flow through the mesh into the separated space between the mesh 24 and the substrate surface 20. Conversely, if the viscosity is too high, the polymeric material may be prevented from intermingling and merely pool on top of the mesh 24.

The thickness of the lining 14 may be varied to suit the requirements of the particular application of the present invention. However, lining thickness will preferably be in the range of 40–100 mils (1.0–2.5 mm). Lining thickness of 60–80 mils (1.5–2.0 mm) is most preferable for general contamination protection application. However, for applications involving aggressive chemicals, lining thicknesses in excess of 80 mils (2.0 mm) may be preferable.

It is conceivable that other forms of attachment members may be utilized other than a mesh 24 deformed by spacers 34 to form lining 14. For example, the attachment member may consist of a perforated plate in which ridges are formed in a surface of the plate. The perforations in the plate must be sufficient in size and number to provide for intermingling between the lining and the perforated plate sufficient to secure the lining and the plate and to provide for passage of fluid into passages provided for by the attachment member.

It is further conceivable that a polymeric lining may be preformed to have tent-like formations in one of its surfaces. Subsequent placement and securement of the lining to the substrate, as by gluing for example, would eliminate the need for structure such as a deformed mesh to create the tented portions.

The particular shape of the tented portions, in whatever manner they are formed, is not critical and need not have the generally rounded shape shown in the figures. Passages suitable for channeling fluid between the lining 14 and the substrate 12 may have generally triangular or corrugated sections, for example.

Figure 3:
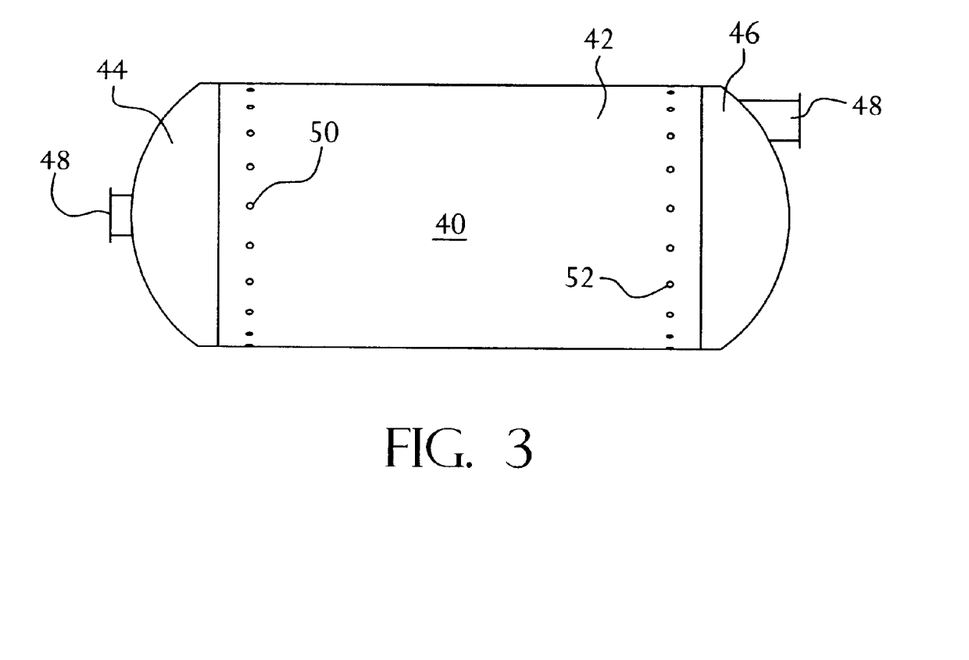
FIG. 3 is a side view of a vessel having an inner surface protected by the system of FIG. 1.
Figure 4:
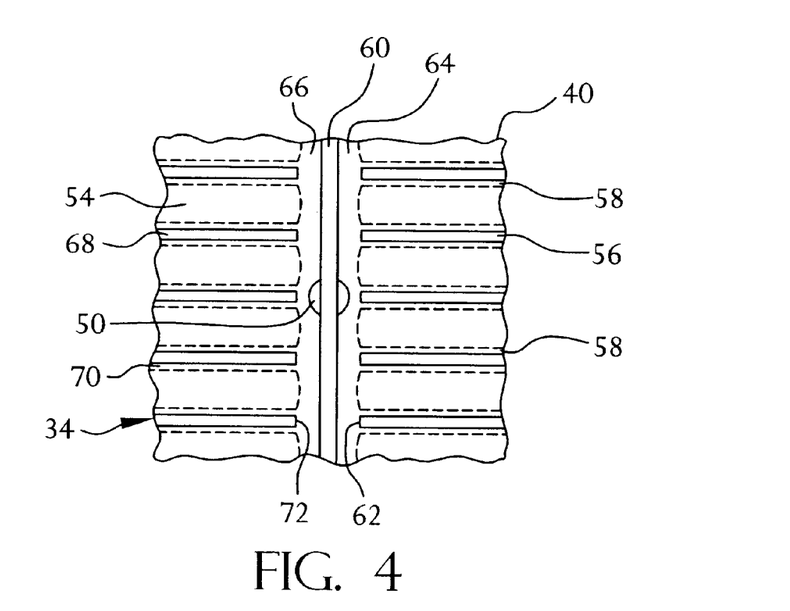
FIG. 4 is a detail view of the inner surface of the vessel of FIG. 3 adjacent a vent hole in which the lining and support mesh have been removed.
Figure 5:
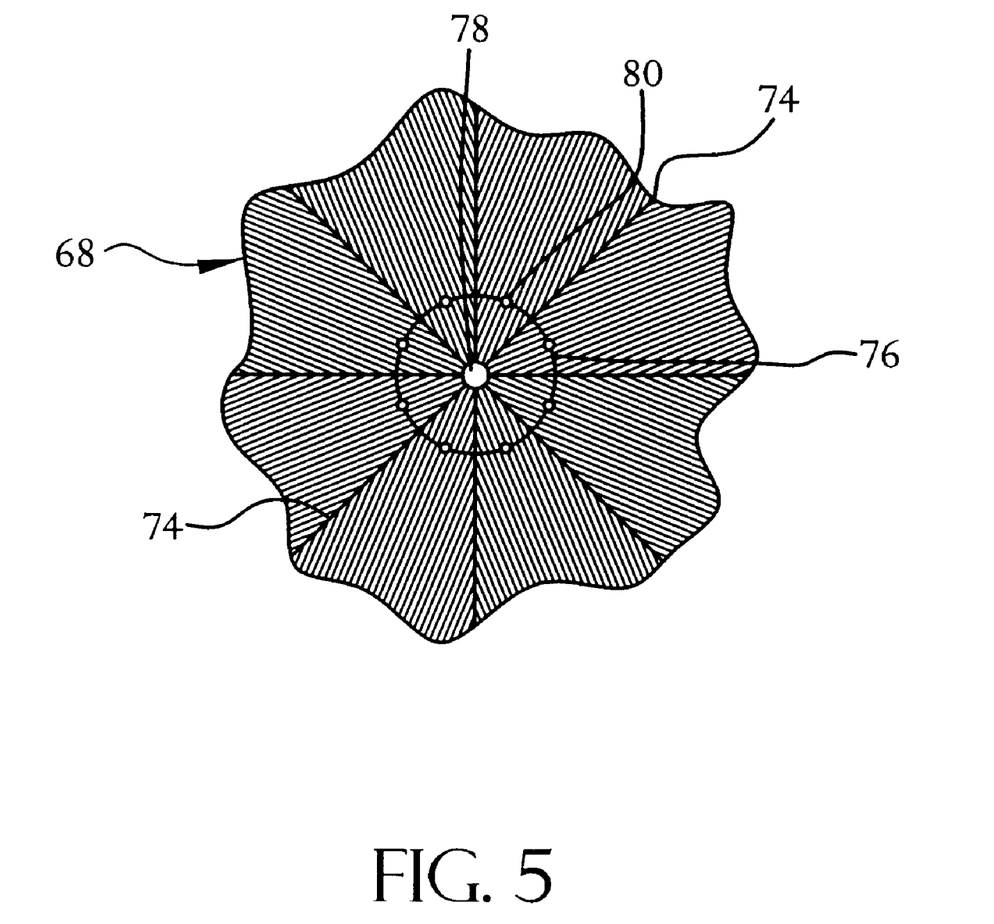
FIG. 5 is a partial end view of one of the domed end portions of the inner surface of the vessel of FIG. 3 in which the lining and support mesh have been removed.

Turning to FIGS. 3–5, the application of the system 10 of FIGS. 1–2 in the interior of a vessel 40 is shown. The vessel 40 includes a generally cylindrical barrel portion 42 and opposite domed end portions 44,46 secured to the barrel portion 42 by any suitable attachment means such as welding for example. The domed ends 44, 46 have nozzled openings 48 providing access to the interior of the vessel 40 for inlet and discharge of fluids and for repairs, for example. The vessel 40 further includes openings 50, 52 circumferentially spaced about the vessel 40 at opposite ends of the barrel portion 42. Each of the openings 50, 52 extends through the wall of the vessel 40 from an inner surface 54 of the vessel to provide for venting of contained fluids which may penetrate through the protective lining 14 and be channeled in a system of ducting passages in the manner to be described.

The system 10 of FIGS. 1–2 is utilized to protect the inner surface 54 of the vessel 40 by limiting contact of a fluid contained within the vessel 40 with the inner surface 54. Referring to FIG. 4, there is illustrated in the detail view a network of spacers 34 on the inner surface of vessel 40 adjacent domed end portion 44 according to the present invention for forming a venting system of passages. The lining 14 and mesh 24 of the system 10 have been removed for purposes of illustrating the arrangement of interconnecting passages. The boundaries of the passages provided by system 10 are illustrated in FIG. 4 by dotted lines. The spacers 34 of vessel 40 include spacers 56 which preferably extend parallel to one another along the barrel portion 42 between openings 50, 52. Exact parallelism is not required between the spacers 56. However, the spacers 56 should be oriented substantially parallel to one another such that adjacent ones of the spacers 56 will not intersect over the length of the spacers 56. The parallel spacers 56 create a generally parallel array of longitudinally extending collector passages 58. The spacers also include spacers 60 which extend transversely to, and most preferably perpendicularly to, the parallel spacers 56 adjacent to ends 62 of the parallel spacers 56. The transverse spacers 60 create manifold passages 64, 66 on opposite sides of the transverse spacers 60. As may be seen in FIG. 4, manifold passage 64 communicates with multiple collector passages 58 which facilitates collection of fluids which may penetrate through the lining 14 for removal of the fluid from the vessel 40. The openings 50 are preferably located such that each of the openings communicates with both of the manifold passages 64, 66 on opposite sides of the transverse spacer 60. A similarly arranged transverse spacer 60, not shown, at the opposite ends of the parallel spacers 56 provides for channeling of fluid to openings 52 adjacent domed end portion 46.

The vessel 40 further includes spacers 68 forming collector passages 70 extending into the domed end portions 44, 46 for removal of fluid which may penetrate through the protective lining 14 in the domed end portions. As seen in FIG. 4, each of the domed end spacers 68 has an end 72 located adjacent manifold passage 66. The collector passages 70 communicate with the manifold passage 66 and extend longitudinally toward the centers of the domed end portion 44, 46.

Referring to FIG. 5, the arrangement of spacers 68 forming the lining 14 in the domed end portion 44 of the vessel 40 is shown. The geometry of the domed end portions requires that the spacers 68, and the collector passages they form, converge as the center of the domed end portions are approached. The spacers 68 of the domed end portion 44 include principal spacers 74 extending from the transverse spacer 60 on the barrel portion 42 to a transverse spacer 76 extending about a centrally located drain opening 78. As seen in FIG. 5, the principal spacers 74 divide the domed end portion 44 into pie shaped segments of spacers. Within each of the pie shaped segments, certain ones of the spacers 68 are terminated as they intersect with one of the principal spacers 74. The vessel 40 includes openings 80 adjacent to the transverse spacer 76 which, in a similar manner to the openings 50, 52 provide for venting of fluid through the vessel 40 to the exterior of the vessel. Differing arrangements of principal spacers and terminating spacers are conceivable from the symmetrical pattern shown in FIG. 5. Deviation from the pattern shown may be required, for example, where multiple access nozzles are provided in the domed end portion remotely located from the center.

The spacing between the spacers forming the ducting passages is not limited to that which is shown in the figures. The spacing between the passages may be varied to suit the requirements of a particular application of the present invention.

Figure 6:
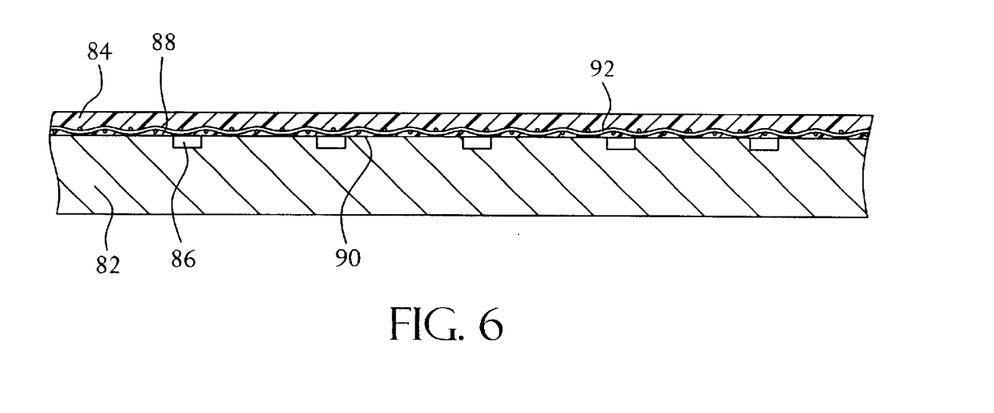
FIG. 6 is another embodiment according to the invention

Referring to FIG. 6 another embodiment according to the present invention is illustrated. A substrate 82 having a protective polymeric lining 84 is shown. The substrate 82 includes channels 86 formed in surface 88 of the substrate to provide for channeling of fluid which may penetrate through the lining 84 to the interface between substrate surface 88 and surface 90 of lining 84. A metal mesh 92 is preferably secured to the surface of the substrate by micro-welding in the manner shown in FIG. 2 such that the mesh 92 is at least partially embedded in the lining 84 adjacent to surface 90.

The practice of the present invention is illustrated by the following non-limiting examples.

Example 1: A 1 ft.×1 ft. carbon steel test panel was prepared by micro-welding a stainless steel mesh over ⅛ inch (3.18 mm) diameter stainless steel wire so as to create a tented coating with peaks and micro-welds at a repeating interval of about ½ inch (12.7 mm). A PFA lining approximately 60 mils (1.5 mm) in thickness was applied in a liquid dispersion spray and bake coating process. The PFA intermingled with the threads of the mesh upon curing resulting in bonding of the lining to the mesh and not to the underlying carbon steel panel near the tenting wires. This resulted in a tented coating having clear passages beneath the PFA lining on each of opposite sides of the tenting wires, through which gases could easily pass. The stainless steel mesh applied to the test panel in this example consisted of 12 threads per inch each having a diameter of 0.015 inches (0.4 mm).

Example 2: A test panel was prepared as in Example 1 with a tenting wire having a diameter of 3/16 inch (4.8 mm). Similar to the test panel in Example 1, an array of passages one foot in length were created through which gas could easily pass.

Example 3: A 1,000 gallon (3,785 liters) carbon steel vessel having a central cylindrical barrel portion and opposite domed ends was fabricated and lined with the ducted PFA coating described in Example 1. On the barrel portion, an array of parallel channels was created running along the length of the barrel portion. The parallel channels communicated at each of opposite ends with two circuitous passages extending perpendicularly to the parallel passages on the barrel portion adjacent to the onset of the domed end portions. The circuitous passages were each vented to the exterior of the vessel by 21, ⅛ inch (3.18 mm) diameter holes equally spaced around the circumference of the barrel portion. The domed end portions were divided into converging segments of passages extending between the circuitous passages on the barrel portion and a smaller circuitous passage located near the center of the domed end portion. The coated vessel was inspected at 10 KV to ensure that it was pore free, installed and pressure tested with nitrogen. The test data for the vessel provided below demonstrated that gas can penetrate through the pore-free liner to be channeled through the passages provided in the lining to be discharged through the vent holes.

| Pressure | Approx. N₂ Gas Flow |
|---|---|
| 120 psig | 20 cc/min. |
| 180 psig | 30 cc/min. |
| 240 psig | 40 cc/min |
| 300 psig | 45 cc/min |
| 330 psig | 50 cc/min |

Following the above pressure test, the vessel was placed in chemical process service at elevated temperatures and pressures wherein the protective lining of the present invention continued to vent deleterious gases from the vessel without deformation of the lining or sealing of the venting passages.

While the present invention has been described in connection with the preferred embodiments of the various figures, it is to be understood that other similar embodiments may be used or modifications and additions made to the described embodiments for performing the same function of the present invention without deviating therefrom. Therefore, the present invention should not be limited to any single embodiment, but rather should be construed in breadth and scope in accordance with the recitation of the appended claims.

What is claimed is:

1. A substrate protected by a polymeric lining, for use in a fluid environment, comprising:
    a substrate having a surface adapted for facing a fluid-filled space; and
    a polymeric lining adjacent the substrate surface such that the lining is positioned between the substrate and the fluid-filled space, either or both of the substrate and lining being formed or disposed in such a manner to provide passageways therebetween for channeling fluid which penetrates through the lining from the fluid-filled space and collects between the lining and the substrate surface,
    the substrate further including at least one opening communicating with one of the passageways and with a surface of the substrate opposite the fluid-filled space for venting fluid from the passageway.

2. The protected substrate according to claim 1 further comprising structures formed in or attached to the substrate surface which secure the lining to the substrate.

3. The protected substrate according to claim 2 wherein the structures comprise a mesh which is at least partially embedded in the lining.

4. The protected substrate according to claim 3 further comprising a plurality of elongated spacers disposed between the substrate surface and the mesh to separate portions of the lining from the substrate, the separated portions of the lining and the substrate defining passageways for channeling fluid.

5. The protected substrate according to claim 4 wherein the elongated spacers are generally circular in cross-section.

6. The protected substrate according to claim 5 wherein the elongated spacers comprise lengths of wire.

7. The protected substrate according to claim 4 wherein at least a portion of the spacers extend substantially parallel to one another to provide a generally parallel array of passageways for channeling fluid, and wherein at least one of the spacers extends transversely with respect to the parallel array to form a transverse passageway for collecting fluid from the parallel array of passageways.

8. The protected substrate according to claim 1 wherein the surface of the substrate is formed to provide the passageways for channeling fluid.

9. The protected substrate according to claim 1 wherein the polymeric lining comprises one or more fluoropolymers.

10. The protected substrate according to claim 1 wherein the fluoropolymer is selected from the group consisting of polytetrafluoroethylene, perfluoroalkoxy-tetrafluoroethylene copolymer, fluorinated ethylene-propylene copolymer, ethylene-chlorotrifluoroethylene copolymer, ethylene-tetrafluoroethylene copolymer, polyvinylidene fluoride and combinations thereof.

11. A vessel adapted for containing a fluid, the vessel comprising:
    a surface defining a space for containing a fluid;
    a polymeric lining adjacent the vessel surface and positioned between the surface and the space, either or both of the vessel surface and the lining being formed or disposed in such a manner to provide passageways therebetween for channeling fluid which penetrates the lining from the space and collects between the lining and the vessel surface,
    the vessel further including at least one opening communicating with one of the passageways and with a surface of the vessel opposite the space for venting fluid from the passageway.

12. The vessel according to claim 11 further comprising structures formed in or attached to the vessel surface which secure the lining to the vessel.

13. The vessel according to claim 12 wherein the structures comprise a mesh which is at least partially embedded in the lining.

14. The vessel according to claim 13 further comprising a network of elongated spacers disposed between the vessel surface and the mesh to separate portions of the lining therefrom, the separated portions of the lining and the vessel surface defining passageways for channeling fluid.

15. The vessel according to claim 14 wherein the elongated spacers are generally circular in cross-section.

16. The vessel according to claim 15 wherein the elongated spacers comprise lengths of wire.

17. The vessel according to claim 14 wherein the network of spacers includes spacers extending substantially parallel to one another to provide a generally parallel array of passageways for channeling fluid between the vessel surface and the lining, the network further including at least one spacer extending transversely with respect to the parallel array of passageways to form a transverse passageway for collecting fluid from the parallel array of passageways.

18. The vessel according to claim 11 wherein the vessel surface is formed to provide the passageways for channeling fluid.

19. The vessel according to claim 11 wherein the polymeric lining comprises one or more fluoropolymers.

20. The vessel according to claim 19 wherein the fluoropolymer is selected from the group consisting of polytetrafluoroethylene, perfluoroalkoxy-tetrafluoroethylene copolymer, fluorinated ethylene-propylene copolymer, ethylene-chlorotrifluoroethylene copolymer, ethylene-tetrafluoroethylene copolymer, polyvinylidene fluoride and combinations thereof.

21. A method of forming a polymeric lining on a substrate for use in a fluid environment, the method comprising the steps of:

provinding a substrate having a surface adapted to face a fluid-filled space;

providing structures on the surface of the substrate for anchoring a polymeric lining to be formed thereon;

forming the polymeric lining on the structures and the substrate surface, the lining being formed on the substrate in such a manner so as to provide passageways between the substrate surface and the lining for channeling fluid which penetrates through the lining from the fluid-filled space and collects between the lining and the substrate surface, forming at least one opening in the substrate communicating with one of the passageways and with a surface of the substrate opposite the fluid-filled space for venting fluid from the passageway.

22. The method according to claim 21 wherein the lining is formed by depositing a polymer or polymer precursor onto the structures and the substrate surface and optionally curing the deposited polymer or polymer precursor.

23. The method according to claim 21 wherein the step of providing structures on the substrate surface comprises attaching a mesh thereto.

24. The method according to claim 23 further comprising attaching a network of elongated spacers to the substrate surface before attaching the mesh to separate portions of the lining to be formed on the mesh from the substrate, the separated portions of the lining and the substrate surface defining passageways for channeling fluid between the lining and the substrate surface.

25. The method according to claim 24 herein the elongated spacers comprise lengths of wire.

26. The method according to claim 22 wherein the polymer is a fluoropolymer.

* * * * *